No. 886,235. PATENTED APR. 28, 1908.
C. J. MUNDHENK.
INTERNAL COMBUSTION ENGINE.
APPLICATION FILED JULY 9, 1907.
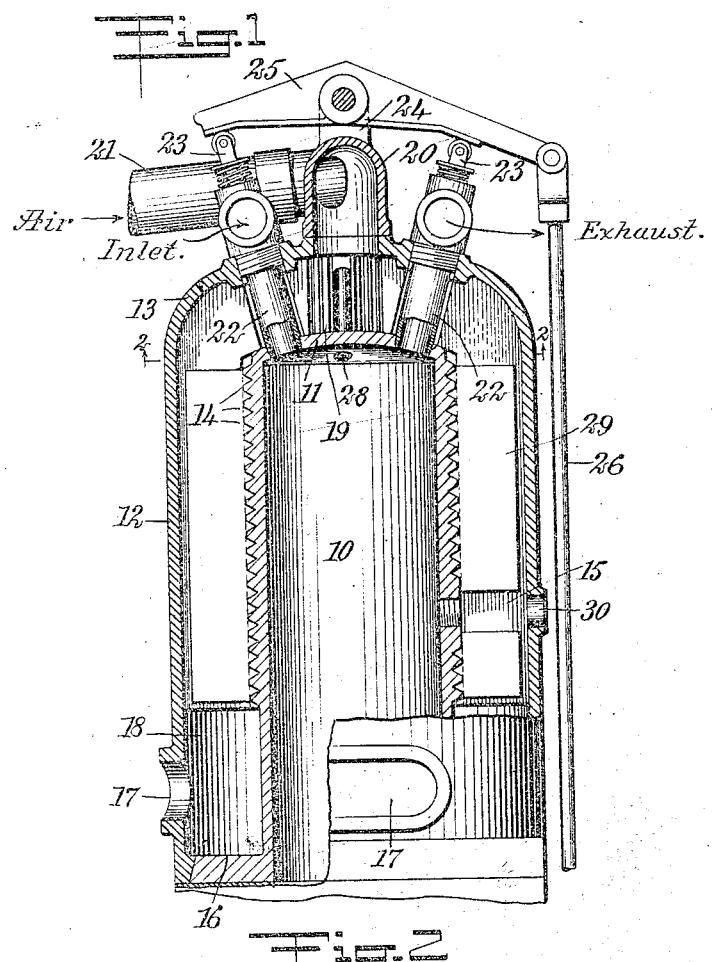
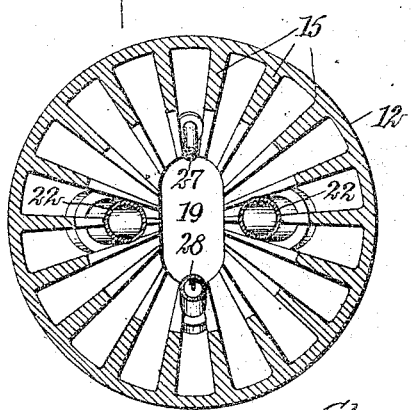
WITNESSES
INVENTOR
Charles J. Mundhenk
BY
ATTORNEYS

UNITED STATES PATENT OFFICE.

CHARLES J. MUNDHENK, OF FREEPORT, ILLINOIS.

INTERNAL-COMBUSTION ENGINE.

No. 886,235.

Specification of Letters Patent.

Patented April 28, 1908.

Application filed July 9, 1907. Serial No. 382,844.

*To all whom it may concern:*

Be it known that I, CHARLES J. MUNDHENK, a citizen of the United States, and a resident of Freeport, in the county of Stephenson and State of Illinois, have invented a new and Improved Internal-Combustion Engine, of which the following is a full, clear, and exact description.

This invention relates to certain improvements in internal combustion engines, and more particularly to improvements in the cylinder and cylinder head construction whereby the cylinder may be more efficiently and uniformly cooled, the means for distributing the cooling agent being so disposed as to aid in the support of the cylinder and strengthen the same.

The invention consists in certain features of construction and combinations of parts, all of which will be fully set forth hereinafter and particularly pointed out in the claims.

Reference is to be had to the accompanying drawings, forming a part of this specification in which similar characters of reference indicate corresponding parts in both the figures, and in which Figure 1 is a central longitudinal section through a portion of an engine constructed in accordance with my invention; and Fig. 2 is a transverse section on the line 2—2 of Fig. 1.

The cylinder and jacket employed in connection with the improvements hereinafter claimed are similar in many particulars to the construction disclosed in my prior patent No. 865,202, granted September 3, 1907. The cylinder 10 is formed integral with the cylinder head 11, and both are formed of as thin material as is possible to employ while maintaining the required rigidity and strength. A jacket 12 surrounds the body of the cylinder and is provided with a head 13 spaced from the cylinder head 11 and preferably integral with the main body of the jacket. The cylinder and jacket, as well as the cylinder head and jacket head, are so constructed as to facilitate the uniform distribution of the cooling medium admitted to the jacket, and this distributing means also serves to brace and strengthen the cylinder and reinforce the same, whereby the jacket receives a portion of the strain on the cylinder. The main body of the cylinder is provided with circumferential flanges 14 extending from adjacent the cylinder head 11 to a point spaced a short distance from the lower end of the cylinder. The jacket is provided with longitudinally-disposed radial flanges 15 of a length slightly less than the length of the cylinder and terminating adjacent the last of the annular flanges 14 at the lower end of the cylinder. The longitudinal flanges of the jacket engage with the outer edges of the circumferential flanges of the cylinder, and thus serve as braces, whereby the cylinder is strengthened and reinforced by the jacket. At the same time the flanges constitute partitions which form with the cylinder and jacket a plurality of passageways. At the lower end of the cylinder I provide an annular flange 16 which extends from the cylinder to the jacket and firmly braces the lower end of the cylinder and completely closes the space therebetween. The jacket is provided with a plurality of large openings 17 upon one or more sides thereof and between the ends of the flanges 15 and the flange 16, whereby an annular chamber 18 is formed which is closed at its lower end and communicates at its upper end with the space between the longitudinal flanges 15.

At the opposite end of the structure, each of the flanges or partitions 15 extends partially across the cylinder head and firmly engages with said cylinder head to brace the latter against the jacket head. The flanges here extend radially and all terminate at a short distance from the center of the cylinder head, thus leaving a chamber 19 communicating with the radially-extending passages between said flanges. Secured to the jacket head 13 or integral therewith I provide a coupling 20 communicating with the chamber 19 through an opening in the jacket head, and having a conduit 21 connected thereto for the delivery of the cooling medium.

For additionally bracing the cylinder head and jacket head, and for permitting the admission and escape of the fuel and exhaust gas, I provide tubes 22 screw-threaded to the cylinder head at their inner ends and screw-threaded to the jacket head intermediate their ends. These tubes serve for the reception of the inlet and outlet valves, and are provided with suitable conduits, not shown, for the delivery of the fuel supply and the conducting away of the exhaust gas. The valves are operated by suitable valve stems 23, which extend out through the ends of the tubes, and pivotally mounted between lugs 24 carried by the coupling 20 is a lever arm 25 for engaging with rollers upon the outer ends of the valve rods 23 for opening and closing the valves at the desired time. As illustrated, only a single lever arm is employed, and this arm is operated by a single connecting rod 26, although it is evident that the valves may be operated independently and various mechanism may be employed for opening and closing them at the desired times in the cycle of operation. Also extending from the jacket head to the cylinder head and preferably rigidly connected to both, is a spark plug 27 and a conduit 28 carrying the pet cock. Both of these also serve to rigidly space the cylinder head and jacket head at the desired distance apart.

In the operation of my improved engine, air or other suitable cooling medium is supplied through the conduit 21 and coupling 20 to the chamber 19, from which it passes out through the radial passages to the outer edge of the cylinder head and then passes longitudinally of the cylinder between the flanges 15 into the annular chamber 18, from which it may escape through the openings 17. For additionally cooling the cylinder I may, if desired, provide radiating strips 29 on the cylinder wall and extending outward into the longitudinal passages between the flanges 15. The body of the cylinder is cooled by the annular flanges 14 and the longitudinal strips 29, and the radial disposition of the flanges intermediate the cylinder head and jacket head causes a thorough and uniform distribution of the air.

If desired, an additional exhaust port 30 may be provided so disposed as to be uncovered by the piston at the end of its stroke.

Having thus described my invention, I claim as new and desire to secure by Letters Patent:

1. An internal combustion engine, including a cylinder having a cylinder head, a jacket having a jacket head, partitions between the cylinder and jacket forming longitudinally-extending passages, partitions integral with the first-mentioned partitions and disposed between said cylinder head and said jacket head forming radially-disposed passages communicating with the first-mentioned passages, and means for delivering a cooling medium into engagement with the cylinder head adjacent the center thereof, whereby it may flow through said radial and longitudinally-disposed passages.

2. In an internal combustion engine, a cylinder having a cylinder head, a jacket having a jacket head, flanges between the cylinder and jacket and forming longitudinally-extending passages, flanges integral with the first-mentioned flanges and extending between said cylinder head and jacket head and forming radially-disposed passages communicating with the first-mentioned passages, and means for delivering a cooling medium into engagement with the cylinder head adjacent the inner end of each of said radially-disposed passages.

3. In an internal combustion engine, a cylinder having a cylinder head, a jacket having a jacket head, flanges carried by said jacket and jacket head and extending into engagement with said cylinder and cylinder head, each of said flanges having one end thereof adjacent the center of the cylinder head and the other end thereof adjacent the opposite end of the cylinder, said flanges forming radially-disposed and longitudinally-extending passages, and means for delivering a cooling medium adjacent one end of each of said passages.

4. In an internal combustion engine, a cylinder having a cylinder head, a jacket having a jacket head, and means for delivering a cooling medium through said jacket head and into engagement with the cylinder head adjacent the center of the latter, the cylinder and jacket being constructed to form radially-disposed passages extending from the center of the cylinder head to the edges thereof and longitudinally-extending passages along said cylinder, and said jacket being provided with an opening for the escape of the cooling medium adjacent the end of the cylinder opposite to said cylinder head.

5. In an internal combustion engine, a cylinder having a cylinder head, a jacket having a jacket head, an annular flange closing the space between said jacket and cylinder adjacent the end opposite to said heads, a plurality of longitudinally-extending passages between said cylinder and jacket and terminating a short distance from said annular flange, means for delivering a cooling medium through the jacket head into engagement with the cylinder head adjacent the center thereof, and means for uniformly distributing said cooling medium to the several longitudinally-extending passages.

6. In an internal combustion engine, a cylinder head, a jacket head, radially-disposed flanges carried by one and in firm engagement with the other, for bracing and reinforcing the same and forming radial passages, means for delivering a cooling medium through the jacket head into engagement with the cylinder head, whereby it may flow outwardly through the radial passages between said radial flanges, and a plurality of tubes rigidly secured to said cylinder head and said jacket head and also serving to reinforce and brace the cylinder.

7. In an internal combustion engine, a cylinder head, a jacket head, radially-disposed flanges carried by one and in firm engagement with the other for bracing and reinforcing the same and forming radial passages, means for delivering a cooling medium through the jacket head into engagement with the cylinder head, whereby it may flow outwardly through the radial passages between said radial flanges, and inlet and outlet conduits rigidly secured to the cylinder head and the jacket head, for conveying the motive fluids to and from the cylinder.

In testimony whereof I have signed my name to this specification in the presence of two subscribing witnesses.

CHAS. J. MUNDHENK.

Witnesses:
W. N. CRONKRITE,
C. B. COURTNEY.